(12) United States Patent
Jin et al.

(10) Patent No.: US 10,090,725 B2
(45) Date of Patent: Oct. 2, 2018

(54) HOLLOW CUP WINDING CAPABLE OF REDUCING DISTRIBUTION COEFFICIENT

(71) Applicant: Shanghai Moons' Electric Co., Ltd., Shanghai (CN)

(72) Inventors: Wanbing Jin, Shanghai (CN); Binsong Tang, Shanghai (CN); Xin He, Shanghai (CN); Huifan Nie, Shanghai (CN)

(73) Assignee: SHANGHAI MOONS' ELECTRIC CO., LTD., Shanghai (CN)

( * ) Notice: Subject to any disclaimer, the term of this patent is extended or adjusted under 35 U.S.C. 154(b) by 41 days.

(21) Appl. No.: 15/482,233

(22) Filed: Apr. 7, 2017

(65) Prior Publication Data
US 2017/0214286 A1    Jul. 27, 2017

Related U.S. Application Data

(63) Continuation of application No. PCT/CN2016/076104, filed on Mar. 11, 2016.

(30) Foreign Application Priority Data

Jul. 14, 2015   (CN) .......................... 2015 1 0412979

(51) Int. Cl.
*H02K 1/00* (2006.01)
*H02K 3/28* (2006.01)
*H02K 3/47* (2006.01)

(52) U.S. Cl.
CPC ................. *H02K 3/28* (2013.01); *H02K 3/47* (2013.01)

(58) Field of Classification Search
CPC .. H02K 3/28; H02K 3/04; H02K 3/00; H02K 15/0414; H02K 15/105; H02K 17/30
USPC ........ 310/179–180, 184, 195, 198, 202, 208
See application file for complete search history.

(56) References Cited

U.S. PATENT DOCUMENTS

| 2007/0013238 A1* | 1/2007 | Edelson | H02K 3/28 310/12.18 |
| 2010/0090558 A1* | 4/2010 | Suzuki | H02K 15/0471 310/208 |
| 2012/0007461 A1* | 1/2012 | Wang | H02K 3/28 310/198 |
| 2013/0249344 A1* | 9/2013 | Folmli | H02K 3/00 310/184 |

(Continued)

FOREIGN PATENT DOCUMENTS

| CN | 103326489 | 9/2013 |
| CN | 204858795 | 12/2015 |
| JP | 2012147622 | 8/2012 |

OTHER PUBLICATIONS

International Search Report (English and Chinese) and Written Opinion of international application PCT/CN2016/076104, dated Jun. 15, 2016, 10 pages.

*Primary Examiner* — Thanh Lam
(74) *Attorney, Agent, or Firm* — Hamre, Schumann, Mueller & Larson, P.C.

(57) ABSTRACT

The present invention relates to a hollow cup winding capable of reducing distribution coefficient, comprising N phases of windings, where each phase of the windings consists of k (360/k/N)° coil units and the k coil units constitute of backing coil assemblies and forward coil assemblies. Compared with the prior art, the present invention has the advantages of improving motor performance and of being highly universal.

6 Claims, 2 Drawing Sheets

(56) References Cited

U.S. PATENT DOCUMENTS

2013/0307366 A1* 11/2013 Naginsky ............... H02K 3/26
310/180

* cited by examiner

HOLLOW CUP WINDING CAPABLE OF REDUCING DISTRIBUTION COEFFICIENT

BACKGROUND OF THE INVENTION

Technical Field

The present invention relates to a hollow cup winding, in particular to a hollow cup winding capable of reducing distribution coefficient.

Description of the Related Art

In traditional designs, winding coefficients are usually used to measure the utilization ratio of the counter electromotive force of the motor. Tooth sockets in a hollow cup are canceled, causing a decline in the distribution coefficient of the winding and also a decline in the performance of the motor. For example, three phases of windings are uniformly distributed on the surface of a motor stator by an angle of 120°, as shown in FIG. 1. In the Figure, 1-1 is an upper winding A+ of a hollow cup motor; 2-1 is an upper winding B+; 3-1 is an upper winding C+; 1-2 is a lower winding A−; 2-2 is a lower winding B−; 3-2 is a lower winding C−; and 4 is a stator core.

The winding of the traditional hollow cup motor fails to effectively utilize conductors away from the middle line of the winding, resulting in a decline in the motor power intensity, an increase in the resistance and a deterioration of the performance.

BRIEF SUMMARY OF THE INVENTION

The objective of the present invention is to provide a hollow cup winding capable of reducing the distribution coefficient, which can improve the performance of a motor and has high universality, to overcome defects in the prior art.

The objective of the present invention can be fulfilled by the following technical solution:

a hollow cup winding capable of reducing distribution coefficient is characterized by the N phases of windings. Each phase of the winding consists of a k $(360/k/N)°$ coil units and the k coil units constitute the backing coil assemblies and forward coil assemblies.

The backing or forward connection of the k $(360/k/N)°$ coil units is determined by the principle of the maximum counter electromotive force.

For a three-phase two-electrode motor, the three phases of windings are classified into forward coil assemblies and backing coil assemblies, and each coil assembly is comprised of two 60° coil units.

The two 60° coil units are respectively located below the NS electrodes of a stator core.

The three-phase windings are connected in a triangular shape or a star shape.

K is preferably an even number.

Compared with the prior art, the present invention has the following advantages:

1) The method employs k $(360/k/N)°$ coils to reduce the distribution coefficients of individual coils, and the k coils are connected, in principle, to a maximum counter electromotive force according to the numerical value of k and the electrode number of the rotor to enhance the counter electromotive force.

2) By changing the coil distribution, the method makes full use of the conductors in the windings to generate more counter electromotive forces.

3) The method can enhance the counter electromotive force coefficient and improve the motor performance in a unit of phase resistance.

4) The method is flexibly implemented, provides options for coil numbers according to the electrode number of the rotor, employs a connection mode under the principle of maximum sum electromotive force and has universality.

DETAILED DESCRIPTION OF THE INVENTION

The present invention is described in detail with reference to the attached drawings and embodiment.

Embodiment

Aiming at the problem of decline in the counter electromotive force caused by winding distribution, the present invention puts forward a relatively concentrated winding distribution, employs k $(360/k/N)°$ coils to reduce the distribution coefficient of each coil, and determines the forward or backing connection of the coils under the principle of the maximum counter electromotive force according to the numerical value of K and the electrode number of a rotor. In a motor structure, under the condition where the coil number is unchanged, the method of the present invention can achieve a larger counter electromotive force in comparison with the traditional method.

Figure 1:
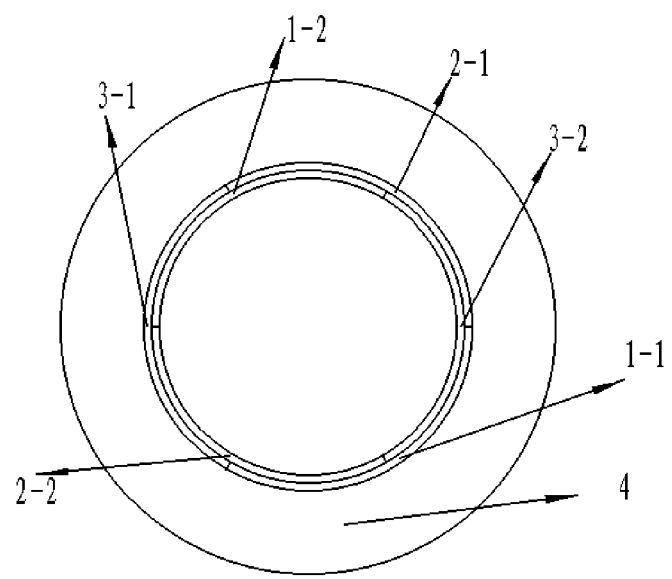
FIG. 1 is a structural view of an existing three-phase winding.
Figure 2:
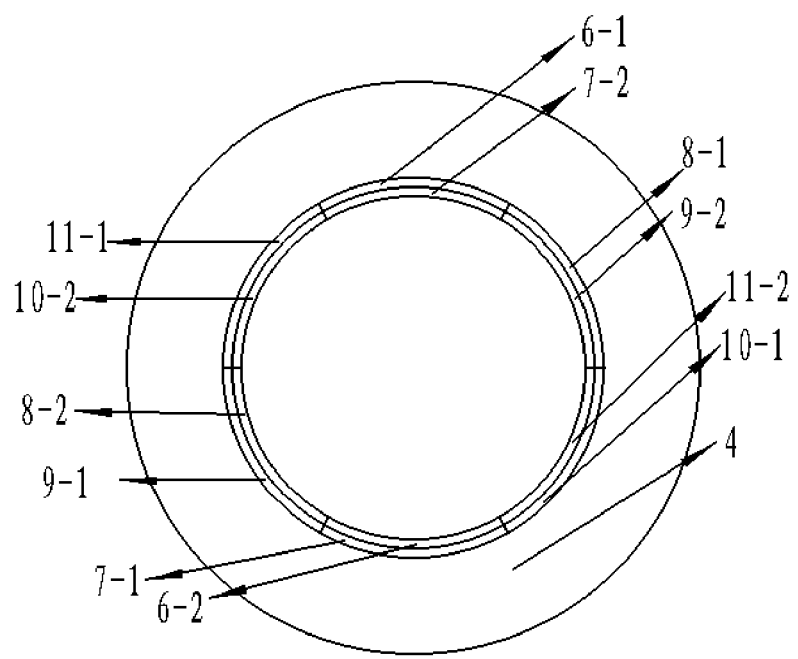
FIG. 2 is a structural view of a three-phase winding of the present invention.
Figure 3:
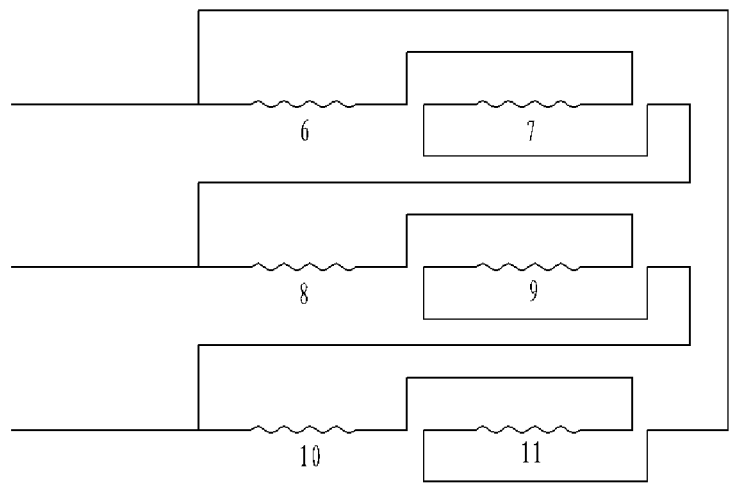
FIG. 3 is a wiring diagram of the three-phase winding of the present invention.

Taking a three-phase two-electrode hollow cup motor as an example, three phases of windings are uniformly distributed at a stator core at a phase angle of 120° in a traditional solution, as shown in FIG. 1. According to an improved solution, an original 120° coil below an electrode is divided into two 60° coils which are respectively located at the NS electrodes, namely k=2. As shown in FIGS. 2, 6-1 and 6-2 constitute a coil 6 in phase A; 7-1 and 7-2 constitute a coil 7 in phase A; 8-1 and 8-2 constitute a coil 8 in phase B; 9-1 and 9-2 constitute a coil 9 in phase B; 10-1 and 10-2 constitute a coil 10 in phase C; and 11-1 and 11-2 constitute a coil 11 in phase A. The electrode number of the rotor is 2, so two coils of the same phase are connected in a reverse way to achieve the maximum counter electromotive force. As shown in FIG. 3, coil 6 and coil 7 are connected in a reverse way; coil 8 and coil 9 are connected in a reverse way; coil 10 and coil 11 are connected in a reverse way; then the three phases of windings are connected in a triangular shape or a star shape. According to the FEA simulation analysis, the method can greatly enhance the counter electromotive force and improve the motor performance under the same number of turns and stator-rotor topology.

What is claimed is:

1. A hollow cup winding capable of reducing distribution coefficient, characterized by N phases of windings, each phase of winding consists of k $(360/k/N)°$ coil units and the k coil units constitute backing coil assemblies and forward coil assemblies.

2. The hollow cup winding capable of reducing the distribution coefficient according to claim 1, wherein, backing or forward connection of the k (360/k/N)° coil units is determined under the principle of the maximum counter electromotive force.

3. The hollow cup winding capable of reducing the distribution coefficient according to claim 1, wherein, for a three-phase two-electrode motor, the three phases of windings are classified into forward coil assemblies and backing coil assemblies, and each coil assembly is comprised of two 60° coil units.

4. The hollow cup winding capable of reducing the distribution coefficient according to claim 3, wherein, the two 60° coil units are respectively located below the NS electrodes of a stator core.

5. The hollow cup winding capable of reducing the distribution coefficient according to claim 3, wherein, the three-phase windings are connected in a triangular shape or a star shape.

6. The hollow cup winding capable of reducing distribution coefficient according to claim 3, wherein, K is preferably an even number.

* * * * *